United States Patent
Jiang

(10) Patent No.: US 11,947,145 B2
(45) Date of Patent: Apr. 2, 2024

(54) STAGE LIGHT FIXTURE WITH SPLIT LIGHT MIXING DEVICE

(71) Applicant: Guangzhou Haoyang Electronic Co., Ltd., Guangzhou (CN)

(72) Inventor: Weikai Jiang, Guangzhou (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 18/091,851

(22) Filed: Dec. 30, 2022

(65) Prior Publication Data

US 2023/0161091 A1  May 25, 2023

Related U.S. Application Data

(63) Continuation of application No. PCT/CN2022/102654, filed on Jun. 30, 2022.

(30) Foreign Application Priority Data

Nov. 23, 2021 (CN) .......................... 202122871943.X
Apr. 29, 2022 (CN) .......................... 202221023098.9
May 31, 2022 (CN) .......................... 202221330142.0

(51) Int. Cl.
  *F21V 8/00*    (2006.01)
  *F21V 9/40*    (2018.01)
  *F21W 131/406* (2006.01)

(52) U.S. Cl.
  CPC .............. *G02B 6/0008* (2013.01); *F21V 9/40* (2018.02); *F21W 2131/406* (2013.01)

(58) Field of Classification Search
  CPC .................................. G02B 6/0008; F21V 9/40
  See application file for complete search history.

(56) References Cited

U.S. PATENT DOCUMENTS

2005/0270794 A1* 12/2005 Okamoto ................ F21V 5/008
                                                    362/555
2013/0294066 A1* 11/2013 Nlina ........................ F21V 7/00
                                                    362/232

(Continued)

FOREIGN PATENT DOCUMENTS

CN          203757604 U          8/2014
CN          204943345 U          1/2016

(Continued)

*Primary Examiner* — Christopher E Dunay
(74) *Attorney, Agent, or Firm* — Muncy, Geissler, Olds & Lowe, P.C.

(57) ABSTRACT

A stage light fixture with a split light mixing device includes a light source for generating a light beam and a light mixing device for reflecting the light. The light mixing device includes a light guide with a gradually changing cross-sectional area and a light beam homogenizer for receiving the light beam emitted from a light output surface of the light guide. The light beam homogenizer and the light guide are independent of each other, and the cross-sectional area of the light beam homogenizer is at least 1.1 times of the cross-sectional area of the light output surface. The stage light fixture further includes a holder for clamping and fixing the light guide, and a cover fastened to the end of the holder away from the light source. The cover is configured to press the light beam homogenizer tightly to closely attach to the light output surface.

20 Claims, 8 Drawing Sheets

(56) References Cited

U.S. PATENT DOCUMENTS

| | | | | |
|---|---|---|---|---|
| 2015/0138826 A1* | 5/2015 | Vinther | ............... | G02B 6/0008 |
| | | | | 362/581 |
| 2018/0364464 A1* | 12/2018 | Senn | ................. | G02B 19/0019 |
| 2021/0254799 A1* | 8/2021 | Chang | ...................... | F21K 9/64 |
| 2022/0091488 A1* | 3/2022 | Hou | ........................ | G02B 7/18 |

FOREIGN PATENT DOCUMENTS

| CN | 111237686 A | 6/2020 |
|---|---|---|
| CN | 210979716 U | 7/2020 |
| CN | 216521434 U | 5/2022 |

* cited by examiner

STAGE LIGHT FIXTURE WITH SPLIT LIGHT MIXING DEVICE

CROSS REFERENCE TO RELATED APPLICATIONS

The present application is a continuation of International Application No. PCT/CN2022/102654, filed on Jun. 30, 2022, which claims priorities from Chinese Invention Application No. 202122871943.X filed on Nov. 23, 2021, 202221023098.9 filed on Apr. 29, 2022, and 202221330142.0 filed on May 31, 2022, all of which are hereby incorporated herein by reference.

TECHNICAL FIELD

The present invention relates to the technical field of stage light fixtures, and more particularly, relates to a stage light fixture with a split light mixing device.

BACKGROUND

In the most of light fixtures, light spots with a color effect are projected in combination with LED chips and a light guide. Generally, the light guide is provided with a frosting sheet on the side thereof away from the light source to produce more uniform light spots. As shown in FIG. 1, in order to prevent light leakage between the frosting sheet and the light guide, an integrated configuration of them is provided in most cases. Although such configuration can firmly combine the frosting sheet and the light guide, the integrated configuration requires high processing accuracy, resulting in increased processing difficulty, and cost is difficult to lower.

Moreover, according to the existing light guide, the light guide with such integrated configuration is usually placed in the through hole of a holder. The light guide is prevented from falling during operation with the frosting sheet, which is located on the light output surface of the light guide, abutted against the step portion on the holder, and fastened with the holder with a cover buckled. However, such fastening method requires high stability for connection between the cover and the holder, as once the cover and the holder are accidentally loosened, the light guide will slide out of the holder to cause damage to the light guide and even damage to other components inside the light fixture.

SUMMARY

Accordingly, the present invention provides a stage light fixture with a split light mixing device, which is free from the problems difficult to process a light guide.

According to the present invention, a stage light fixture with a split light mixing device is provided, which includes a light source for generating a light beam and a light mixing device for reflecting the light beam at least one time. The light mixing device includes a light guide with a gradually changing cross-sectional area and a light beam homogenizer for receiving the light beam emitted from a light output surface of the light guide. The light beam homogenizer and the light guide are arranged independent of each other in the present invention, and the cross-sectional area of the light beam homogenizer is at least 1.1 times of the cross-sectional area of the light output surface. The stage light fixture further includes a holder for clamping and fixing the light guide and a cover fastened to the end of the holder away from the light source. The cover is configured to press the light beam homogenizer tightly to make the light beam homogenizer closely attached to the light output surface.

In the present invention, the light beam homogenizer is tightly attached to the light output surface of the light guide by pressure applied to the light beam homogenizer via the cover, so that too large gap between the light beam homogenizer and the light output surface can be prevented, light leakage thus can be avoided, thereby reducing light loss. In addition, the ratio of the cross-sectional area of the light beam homogenizer to the cross-sectional area of the light output surface is defined, the light beam homogenizer thus can completely cover the light output surface, as a result, precise pre-positioning of the light beam homogenizer is not required when mounting the light beam homogenizer. Therefore, fixing and mounting of the light beam homogenizer will be more convenient. According to the present invention, the light beam homogenizer and the light guide are independent of each other, which thus can be processed separately. In such easy way, processing thereof is simplified, and no high processing accuracy is required, thus reducing processing difficulty. The present invention can also achieve different frosting effects, only by using light beam homogenizers of different frosting degrees according to requirements. Therefore, the light fixture according to the present invention can achieve a variety of light effects, which is more universality, thereby further reducing costs.

According to at least one embodiment of the present invention, the end surface of the holder away from the light source is formed an accommodating cavity for accommodating the light beam homogenizer. The accommodating cavity is recessed in a direction close to the light source. The thickness of the light beam homogenizer is greater than or equal to the depth of the accommodating cavity. With such configuration, when mounting the light beam homogenizer, the light guide is firstly inserted into the holder, the light beam homogenizer is placed in the accommodating cavity, pressure then is applied to the light beam homogenizer via the cover, the light beam homogenizer thus moves close to the light guide and is fixed to the light output surface of the light guide. During the process of applying pressure via the cover, the light beam homogenizer is in surface contact with the light output surface, the force between the light beam homogenizer and the light output surface thus is even, which will be not likely to cause damage while achieving tight pressing. The thickness of the light beam homogenizer is designed to be greater than or equal to the depth of the accommodating cavity, so that the cover can be kept pressing the light beam homogenizer tightly, thereby ensuring the light beam homogenizer being closely attached to the light output surface of the light homogenizing rod all the time.

In order to prevent movement of the beam homogenizer during operation of the light fixture, the side wall of the accommodating cavity can be provided with several positioning ribs for abutting against the periphery of the light beam homogenizer. In such configuration, the light beam homogenizer can be stably placed in the accommodating cavity to limit movement thereof during operation.

In order to make the light beam homogenizer more closely attached to the light output surface, the side surface of the light beam homogenizer close to the light output surface can be a smooth surface.

While the side surface of the light beam homogenizer away from the light output surface can be formed as a frosting surface. The frosting surface can homogenize the light projected from the light output surface so that the light spot formed can be more uniform in color without obvious color blocks when in color mixing.

According to at least one embodiment of the present invention, the cover has a light passing hole for the light beam to pass through, and in the light emitting direction, the projection of the light output surface is located in the light passing hole. As the light beam is reflected in the light guide at least one time, the light beam will be emitted from the light output surface at a certain angle, rather than perpendicularly. In such configuration, it can ensure that the light beam emitted from the light output surface can pass through the light passing hole as much as possible, thus avoiding light loss caused by shielding of the cover.

The cross-sectional area of the light beam homogenizer can be more than twice of the cross-sectional area of the light output surface. By defining such a ratio, the contact area between the light beam homogenizer and the cover can be increased, resulting in that the cover can press the light beam homogenizer tightly all the time and the light beam homogenizer can suffer force more evenly.

To achieve fixed connection between the holder and the cover, in the length direction of the holder, the cover is formed at least two connecting plates extending to the holder, the holder is provided with fastening portions corresponding to the connecting plates, and the cover is fastened to the holder via the connecting plates cooperated with the fastening portions. With the cover fastened to the holder, the light guide can be prevented from sliding out of the light passing hole during operation, forming dual protection to the light guide, thus further enhancing fixing effect on the light guide.

According to the present invention, the material of the cover can be metal, and the cover is provided with an elastic member for abutting against the light guide. The cover made of the metal has better high-temperature resistance and better heat transfer performance, the local heat can be conducted to the whole structure for dissipation. Therefore, the high-temperature burn due to strong light thereof can be avoided to protect the holder. The cover is abutted against the light guide by the elastic member, which can prevent inelastic collision between the light guide and the cover, thus making the light guide more securely fixed.

Specifically, the elastic member can be in form of a metal elastic piece connected to the cover. The configuration of the metal elastic piece will take up less space, which can be directly cut and formed integrally with the cover made of the metal material, forming a simpler structure.

According to the present invention, the metal elastic piece has a connecting segment and an abutting-pressing segment connected to each other. The connecting segment is connected to the inner side of the light passing hole, and the abutting-pressing segment is abutted against the light guide. In such configuration, when the abutting-pressing segment is connected to the cover via the connecting segment and the metal elastic piece is subjected to an external force, the abutting-pressing segment will be bent in the normal direction of the cover with the connecting segment as a base point, thereby generating an elastic force to elastically abut against the light guide.

The number of the metal elastic piece can be multiple according to the present invention, the abutting-pressing segment of each metal elastic piece is in an arc shape, and the abutting-pressing segment of the plurality of metal elastic pieces are successively end-to-end to form a ring shape.

According to the present invention, the elastic member can also be an elastic spacer or a spring, which is disposed between the cover and the light guide. When the sizes of the cover or the light guide are changed, the elastic spacer or spring can still be applied, which has more universality.

In order to avoid the situation that when the cover applies pressure to the light beam homogenizer, the light beam homogenizer will be damaged by the cover due to too small thickness of the light beam homogenizer, the thickness of the light beam homogenizer is designed to range from 1 mm to 3 mm according to the present invention.

According to at least one embodiment of the present invention, the holder further includes a through hole for mounting the light guide, the end surface of the holder far away from the light source is, in the direction close to the light source, provided with tensioning grooves running through the side wall of the through hole, and the end of the light guide close to the light beam homogenizer is in an interference fit with the holder. With the configuration of the tensioning groove, one end surface of the holder has elasticity, so that when the light guide is inserted in the direction close to the light source, the tensioning groove will provide a certain tensioning force to enable the light guide to form interference fit with the holder. Therefore, the light guide can be clamped and fixed only by means of the holder. High stability thus can be achieved in such fixing way, the light guide will not be prone to fall off during operation, and the tensioning groove has the advantages that simple in structure and easy to process.

In order to achieve closer fit between the light guide and the holder, several first ribs for fixing the light guide are further provided in the through hole, which extend in the length direction of the holder, and the through hole is in an interference fit with the light guide via the first ribs. The light guide is pressed tightly via the first ribs according to the present invention, the contact area between the holder and the light guide is reduced, thereby increasing the intensity of pressure of the holder to the light guide, and enabling closer fit between the light guide and the holder.

The end of the light guide close to the light source is a first light guide segment, the side wall of the first light guide segment has a plurality of edges, and in the length direction of the through hole, the inner side wall of the through hole is provided with positioning grooves corresponding to the edges of the first light guide segment. With such configuration, the edges of the first light guide segment, when inserted, can be matched with the respect positioning groove, thereby enabling the light guide to be quickly and accurately inserted and fixed in the through hole.

In order to prevent the light guide from moving during operation, second ribs are provided on both sides of the positioning groove, and each second rib extends in the length direction of the through hole. In such configuration, the positioning groove clamp the edges of the light fixture cooperating with the second ribs to prevent the light guide from moving during operation.

According to the present invention, the cover can further include light shielding plates for shielding the tensioning groove when the cover is fastened to the holder. The light shielding plate can prevent light leakage when the light is emitted from the tensioning groove.

Preferably, in a direction away from the light source, the cross-sectional area of the light guide is gradually increased, and correspondingly, the cross-sectional area of the through hole is gradually increased. In a direction close to the light source, the end of the light guide close to the light incoming surface is inserted into the through hole, then the light guide is gradually pushed, and finally forming interference fit therebetween. In such way, the holder thus can clamp and fix the light guide more stably.

DETAILED DESCRIPTION

Figure 1:
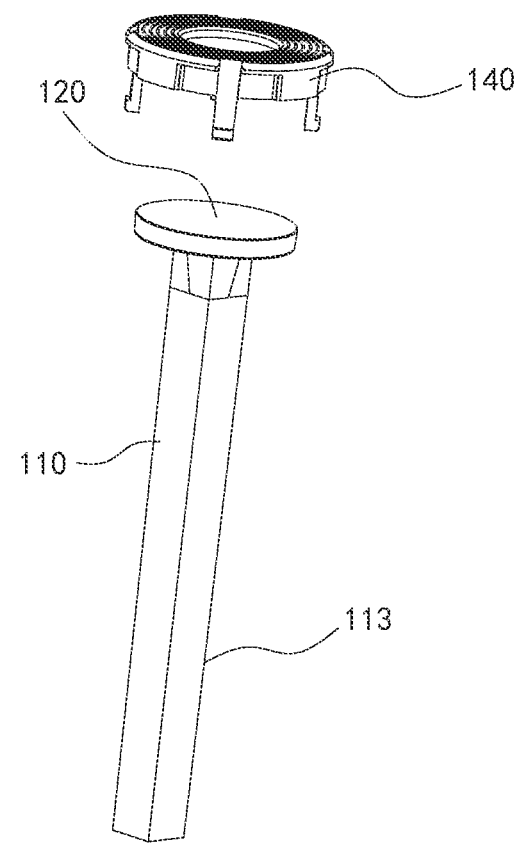
FIG. 1 is an exploded view of a light guide and a mounting base according to a prior art.
Figure 1:
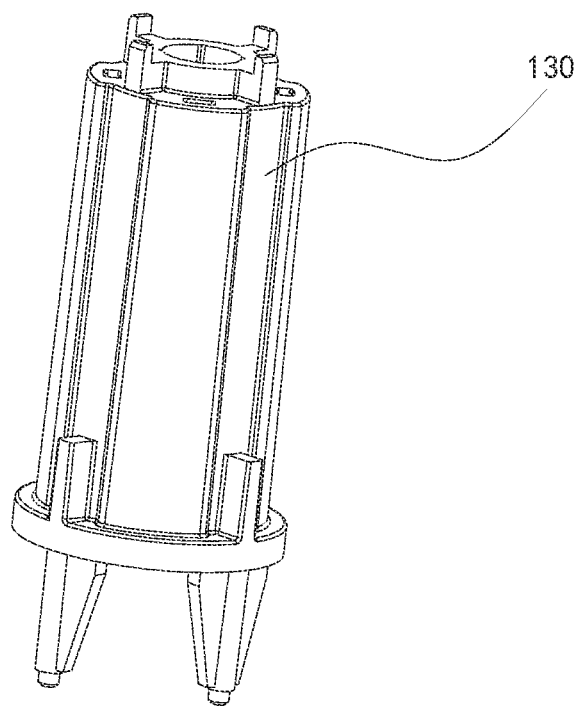

The accompanying drawings of the present invention are for exemplary illustration only, and should not be construed as limitations on the present invention. In order to better illustrate the following embodiment, some parts in the accompanying drawings may be omitted, enlarged or reduced, and they do not represent the size of the actual product; for those skilled in the art, it is understandable that certain well-known structures and descriptions thereof in the drawings may be omitted.

Referring to FIG. 2 to FIG. 5, a stage light fixture with a split light mixing device is provided according to one embodiment, which includes a light source 200 for generating a light beam, and a light mixing device for reflecting the light beam many times. The light mixing device specifically includes a light guide 110 with a gradually changing cross-sectional area and a light beam homogenizer 120 for receiving the light beam emitted from a light output surface 111 of the light guide 110. The light beam homogenizer 120 and the light guide 110 are arranged independent of each other, and the cross-sectional area of the light beam homogenizer 120 is at least 1.1 times of the cross-sectional area of the light output surface 111. The stage light fixture further includes a holder 130 for clamping and fixing the light guide 110, and a cover 140 which is fastened to an end of the holder 130 away from the light source 200, the cover 140 is configured to press the light beam homogenizer 120 tightly to make the light beam homogenizer 120 closely attached to the light output surface 111.

According to the present embodiment, the light beam homogenizer 120 is tightly attached to the light output surface 111 by pressure applied to the light beam homogenizer 120 via the cover 140. With such configuration, too large gap between the light beam homogenizer 120 and the light output surface 111 can be prevented, light leakage thus can be avoided, thereby reducing light loss. is In addition, the ratio of the cross-sectional area of the light beam homogenizer 120 to the cross-sectional area of the light output surface 111 is defined so that the light beam homogenizer 120 can completely cover the light output surface 111, as a result, precise pre-positioning of the light beam homogenizer 120 is not required when mounting the light beam homogenizer 120. Therefore, it is more convenient to fix and mount the light beam homogenizer 120. Further, the light beam homogenizer 120 and the light guide 110 are independent of each other, which thus can be processed separately. In such easy way, processing thereof is simplified, and no high processing accuracy is required, the processing difficulty thus is reduced. The light beam homogenizer 120 can also be replaced with light beam homogenizers of different frosting degrees according to requirements to achieve different frosting effects. Therefore, the light fixture can achieve a variety of light effects, which is more universality, thereby further reducing costs.

In the present embodiment, the cross-sectional area of the light guide 110 is gradually increased along the direction away from the light source 200, and a light incoming surface 112 of the light guide 110 is smoothly transited to the light output surface 111 of the light guide 110.

Preferably, as shown, the light guide 110 is smoothly transited from the light incoming surface 112 in form of regular quadrilateral to the light output surface 111 in form of regular octagonal. In such configuration, the light beam generated by the light source 200 will be reflected by the light guide 110 many times, and the light spot thus formed will be nearly circular, thereby achieving well light mixing and color mixing. All side surfaces of the light guide 110 may be in flat and smooth planes.

Figure 8:
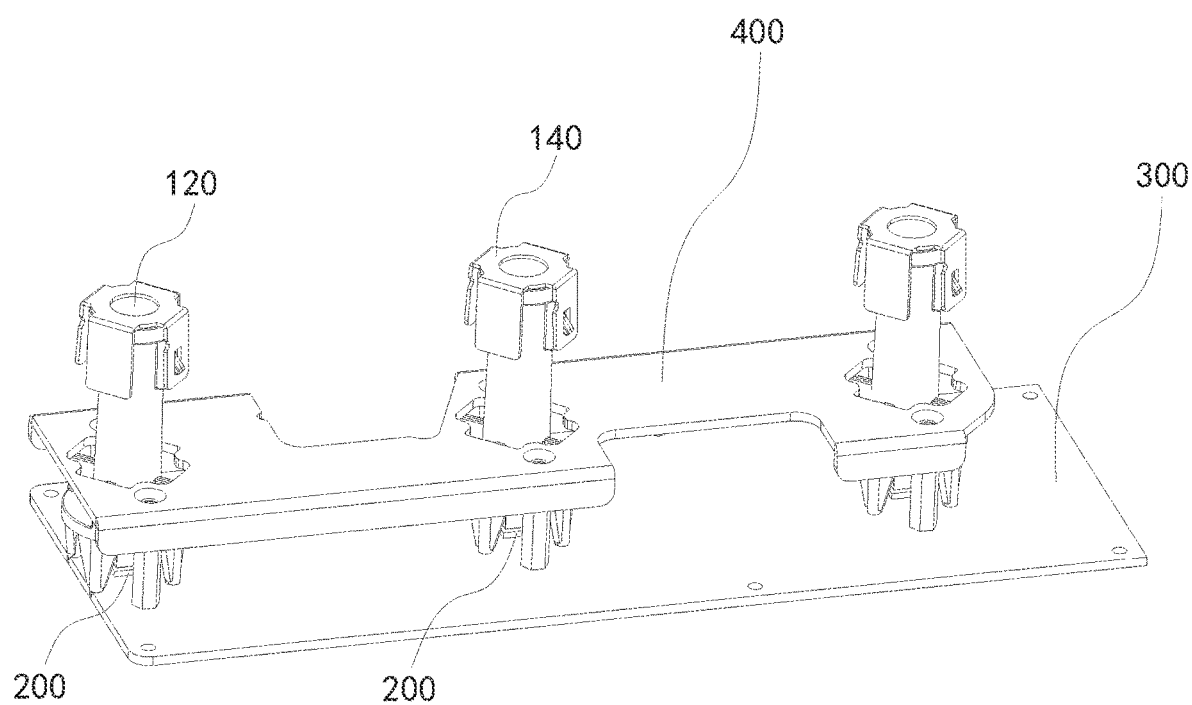
FIG. 8 is a schematic view showing a plurality of light mixing devices mounted on a substrate according to an embodiment of the present invention.

According to some embodiments, the stage light fixture includes a plurality of light sources 200 which are mounted on a substrate 300, thus at least two light mixing devices are provided. Referring to FIG. 8, the stage light fixture further includes a pressing plate 400 which having a plurality of mounting holes for each holder 130 to penetrate. Each holder 130 has four support ribs 136 extending along a direction of light emitting and four supporting legs 135 extending along a direction close to the light source 200. As FIG. 8 shown, each holder 130 is abutted against the substrate 300 via the supporting legs 135, the supporting ribs 136 are pressed tightly by the pressing plate 400, and the pressing plate 400 and the substrate 300 are connected by a connecting column. With the pressing plate 400 cooperated with the substrate 300, each holder 130 thus is fixed above the respect light source 200 without displacement. In addition, with the configuration of the four supporting legs 135 distributed around the light source 200, and the light incoming surface 110 of each light guide 110 is located over the respect light source 200, the light beam emitted from the light source 200 will enter the light guide 110 as much as possible.

Referring back to FIG. 2 to FIG. 5, an end surface of the holder 130 away from the light source 200 is formed an accommodating cavity 131 for accommodating the light beam homogenizer 120 which is recessed in a direction close to the light source 200. The thickness of the light beam homogenizer 120 can be greater than or equal to the depth of the accommodating cavity 131. When mounting the light beam homogenizer 120, the light guide 110 is firstly inserted into the holder 130, then the light beam homogenizer 120 is placed in the accommodating cavity 131. Pressure then can be applied to the light beam homogenizer 120 via the cover 140 so that the light beam homogenizer moves close to the light guide 110 and is fixed to the light output surface 111 of the light guide 110. During the process of applying pressure via the cover 140, the light beam homogenizer 120 is in surface contact with the light output surface 111, the force between the light beam homogenizer and the light output surface thus is even, which will be not likely to cause damage while achieving tight pressing. The thickness of the light beam homogenizer 120 is greater than or equal to the depth of the accommodating cavity 131, in such configuration, the cover 140 can be kept pressing the light beam homogenizer 120 tightly, thereby always ensuring the light beam homogenizer 120 being closely attached to the light output surface 111 of the light homogenizing rod.

The thickness of the light beam homogenizer 120 is preferably greater than the depth of the accommodating cavity 131.

The side wall of the accommodating cavity 131 can be provided with several positioning ribs 1311 for abutting against the periphery of the light beam homogenizer 120. With such configuration, the light beam homogenizer 120 thus can be stably placed in the accommodating cavity 131 to prevent movement thereof during operation.

In the present embodiment, the positioning ribs 1311 are uniformly distributed on the side wall of the accommodating cavity 131, one end of each positioning rib 1311 is connected to the bottom of the accommodating cavity 131, and the other end of each positioning rib is extended to the opening surface of the accommodating cavity 131, so that the light beam homogenizer 120 will suffer stress more evenly. When mounting the light beam homogenizer 120, positioning can be achieved only by placing the light beam homogenizer 120 in the accommodating cavity 131, achieving more convenient operation.

The cross section of the light beam homogenizer 120 and the cross section of the accommodating cavity 131 are preferably both circular. While the shape of the accommodating cavity 131 can be in any form which matches the shape of the light beam homogenizer 120.

In a preferable embodiment of the present invention, the side surface of the light beam homogenizer 120 close to the light output surface 111 is a smooth surface 121. With such smooth surface 121, the light beam homogenizer 120 can be more closely attached to the light output surface 111.

While the side surface of the light beam homogenizer 120 away from the light output surface 111 is a frosting surface 122. The frosting surface 122 can homogenize the light projected from the light output surface 111 so that the light spot formed is more uniform in color without obvious color blocks.

According to an embodiment, the cover 140 has a light passing hole 141 for the light beam to pass through, and in the light emitting direction, the projection of the light output surface 111 is located in the light passing hole 141. As the light beam is reflected in the light guide 110 many times, the light beam will be emitted from the light output surface 111 at a certain angle, rather than perpendicularly. In such way, it ensures that the light beam emitted from the light output surface 111 can pass through the light passing hole 141 as much as possible, avoiding light loss caused by shielding of the cover 140.

The surface of the cover 140 is preferably treated with anti-reflection process to prevent the light beam from being reflected on the surface of the cover 140 to form stray light.

According to a preferable embodiment, the cross-sectional area of the light beam homogenizer 120 is more than twice of the cross-sectional area of the light output surface 111. With such configuration, contact area between the light beam homogenizer 120 and the cover 140 can be increased, resulting in that the cover 140 can press the light beam homogenizer 120 tightly all the time and the light beam homogenizer 120 can suffer force more evenly.

More preferably, the cross-sectional area of the light beam homogenizer 120 is 2.5 times of the cross-sectional area of the light output surface 111.

According to some embodiments, the cover 140 is formed at least two connecting plates extending to the holder in the length direction of the holder. The holder is provided with a fastening portion corresponding to each connecting plate. The cover 140 thus is fastened to the holder via the connecting plates. With the cover 140 fastened to the holder, the light guide can be prevented from sliding out of the light passing hole 141 during operation, forming dual protection to the light guide, thus further enhancing the fixing effect on the light guide.

Figure 2:
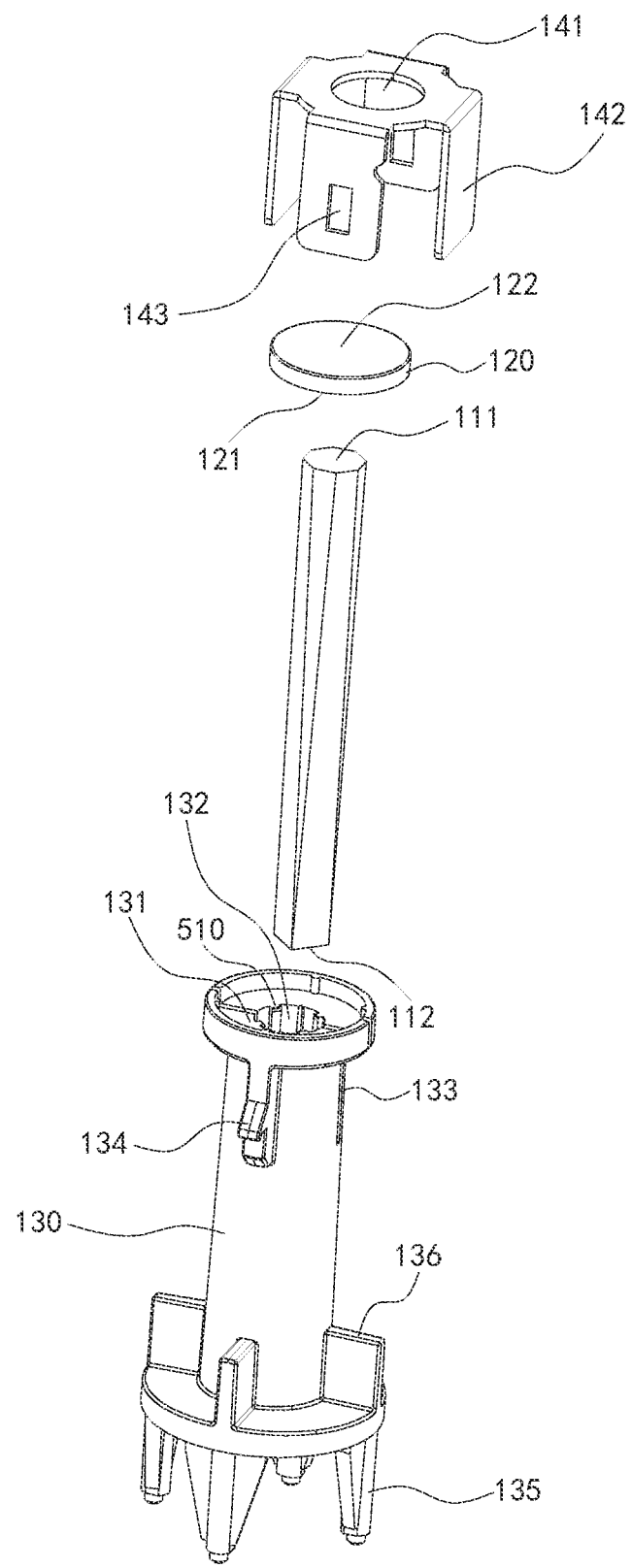
FIG. 2 is an exploded view including a light mixing device, a holder and a cover according to an embodiment of the present invention.

According to a preferable embodiment, as shown in FIG. 2, the fastening portion is a first protrusion 134 on the outer side wall of the holder 130, the fixing portion is a fastening hole 143 formed in the connecting plate corresponding to the first protrusion, the cover 130 thus can be fastened to the end surface of the holder away from the light source 200 by cooperation with the first protrusion and the fastening hole.

Preferably, the surface of the cover is a matte surface, which can avoid glare when the light is reflected by the surface of the cover after emitted from the light passing hole. The matte surface can be formed by spraying matte paint or by grinding.

Figure 7:
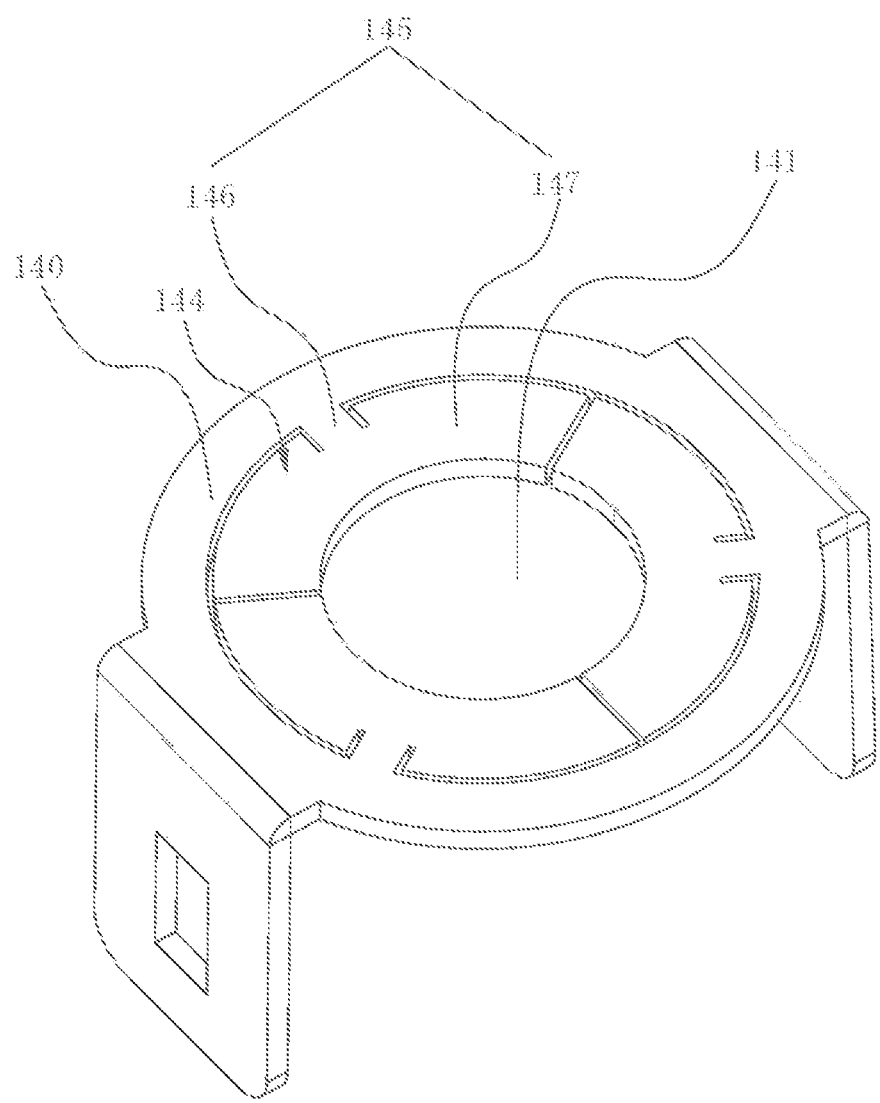
FIG. 7 is a schematic view of a cover according to an embodiment of the present invention.

As shown in FIG. 7, the material of the cover can be metal, and the cover is provided with an elastic member for abutting against the light guide. As the cover made of metal material has better high-temperature resistance and better heat transfer performance, local heat can be conducted to the whole structure for dissipation. Therefore, high-temperature burn due to strong light thereof can be avoided to protect the holder. The cover 140 is abutted against the light guide via the elastic member, which can prevent inelastic collision between the light guide and the cover, thus making the light guide more securely fixed.

The elastic member 144 can be in form of a metal elastic piece 145 connected to the cover 140. The metal elastic piece 145 connected to the cover 140 will take up less space, and the metal elastic piece 145 can be directly cut and formed integrally with the cover 140 made of metal material, which is simple in structure.

As shown in FIG. 7, the metal elastic piece 145 includes a connecting segment 146 and an abutting-pressing segment 147 connected to each other. The connecting segment 146 is connected to the inner side of the light passing hole 141, and the abutting-pressing segment is abutted against the light guide 110. When the abutting-pressing segment 147 is connected to the cover 140 via the connecting segment 146 and the metal elastic piece 145 is subjected to an external force, the abutting-pressing segment 147 will be bent in the normal direction of the cover with the connecting segment 146 as a base point, thereby generating an elastic force to elastically abut against the light guide 110.

The number of the metal elastic piece 145 can be multiple as FIG. 7 shown. In such configuration, each abutting-pressing segment 147 is in an arc shape, and the abutting-pressing sections 147 of the plurality of metal elastic pieces 145 are end-to-end successively to be in a ring shape.

Preferably, the number of the metal elastic pieces is 3.

According to a preferable embodiment of the present invention, the thickness of the light beam homogenizer 120 ranges from 1 mm to 3 mm, which can avoid the situation that when the cover 140 applies pressure to the light beam homogenizer 120, the light beam homogenizer is damaged by the cover 140 due to too small thickness of the light beam homogenizer 120.

More preferably, the thickness of the light beam homogenizer 120 is 2 mm and the depth of the accommodating cavity 131 is 1.5 mm, so that when the cover 140 is fastened to the side wall of the holder 130, the cover 140 maintains in a state of applying pressure to the light beam homogenizer 120. Therefore, the light beam homogenizer 120 can be closely attached to the light output surface 111 of the light guide 110 all the time.

Referring back to FIG. 2 to FIG. 5, especially FIG. 2 the holder 130 further includes a through hole 132 for mounting the light guide 110, the end surface of the holder 130 far away from the light source 200 is, in the direction close to the light source 200, provided with tensioning grooves 133 running through the side wall of the through hole 132, and the end of the light guide 110 close to the light beam homogenizer 120 is in an interference fit with the holder 130. With the configuration of the tensioning groove 133, one end surface of the holder 130 has elasticity, so that when the light guide 110 is inserted in the direction close to the light source 200, the tensioning groove 133 will provide a certain tensioning force to enable the light guide 110 to form interference fit with the holder 130. Therefore, the light guide 110 can be clamped and fixed only by means of the holder 130. High stability thus can be achieved in such easy fixing way, the light guide 110 will not be prone to fall off during operation, and the tensioning groove 133 has the advantages that simple in structure and easy to process.

Preferably, the number of the tensioning grooves 133 is two, and the two tensioning grooves coincide with the diameter of the through hole.

Figure 3:
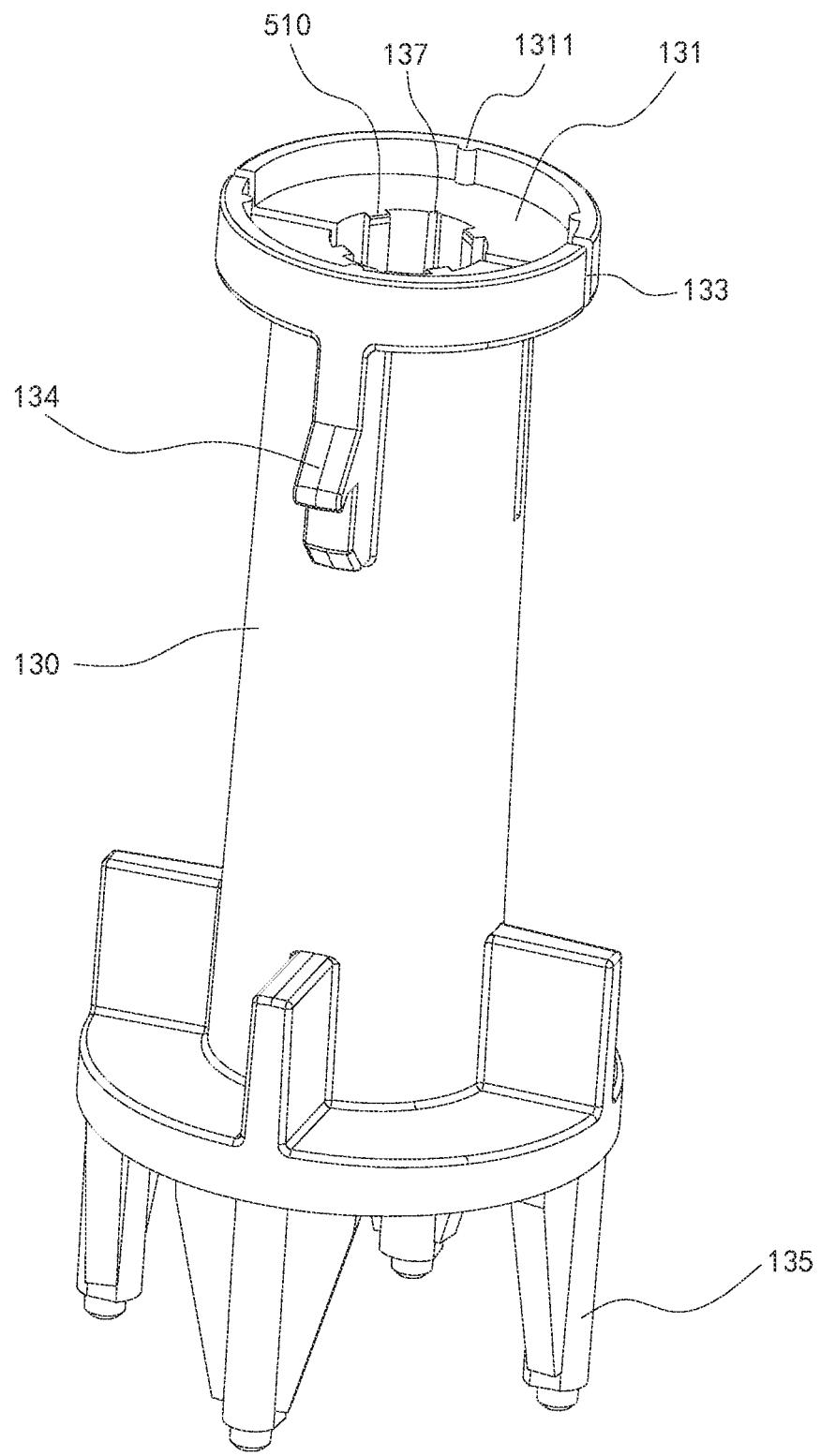
FIG. 3 is a schematic view of the holder shown in FIG. 2.
Figure 4:
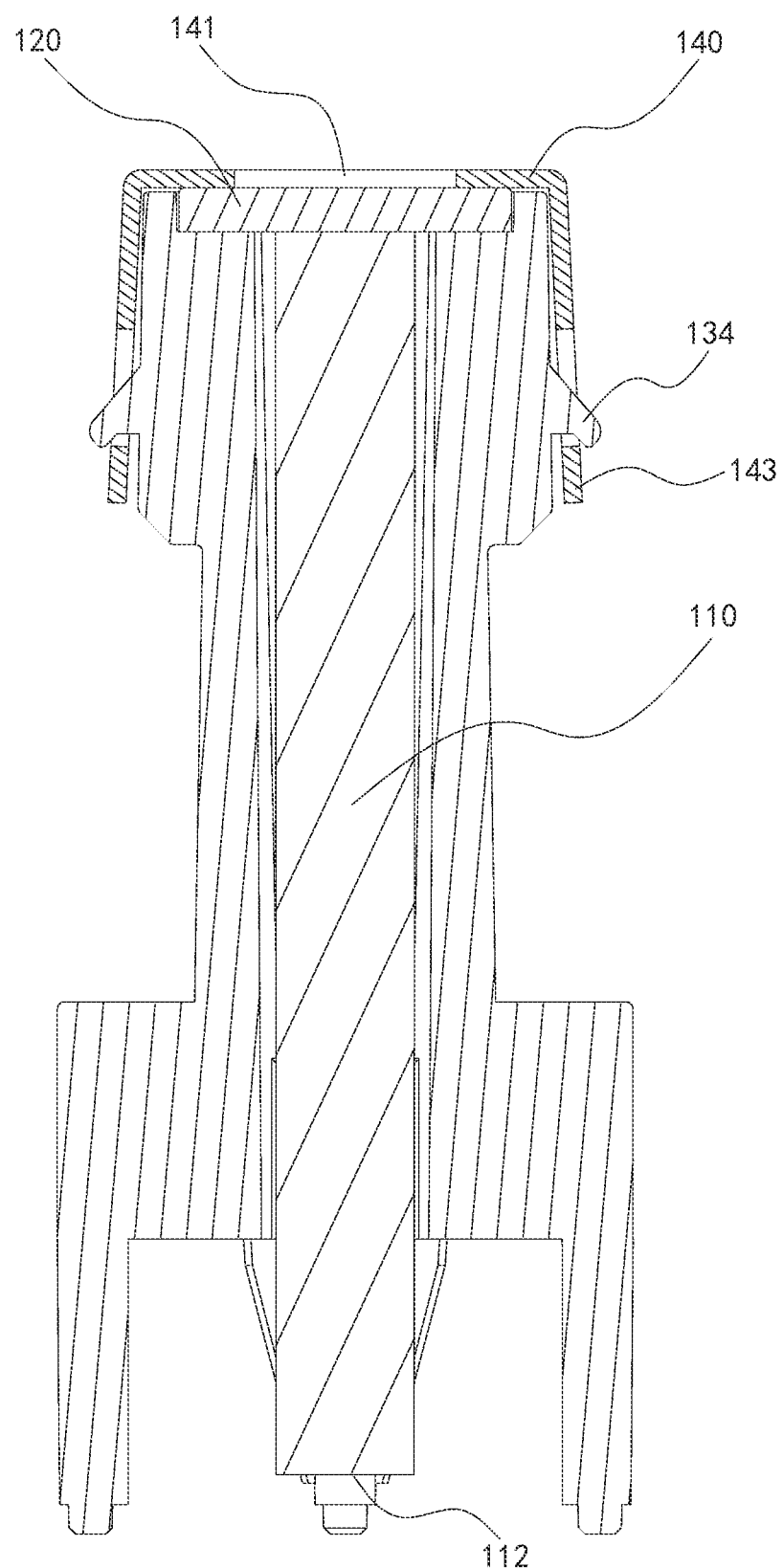
FIG. 4 is a sectional view, with the light mixing device, the holder and the cover assembled, according to an embodiment of the present invention.
Figure 5:
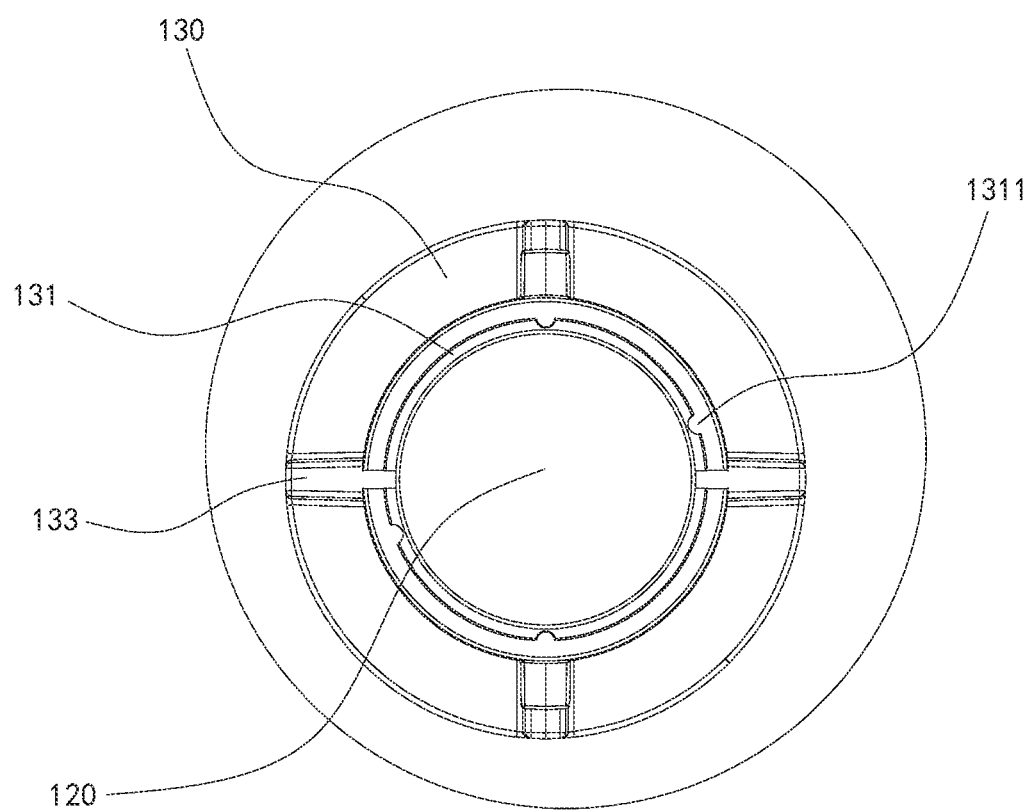
FIG. 5 is a top view of a light mixing device according to an embodiment of the present invention, viewed from a light output surface of the light guide.

According to the present embodiment, several first ribs 510 for fixing the light guide 110 are further provided in the through hole 132, as FIG. 2 and FIG. 3 shown, which extend in the length direction of the holder 130. The through hole 132 thus is in an interference fit with the light guide 110 via the first ribs 510. The light guide 110 is pressed tightly via the first ribs 510, the contact area between the holder 130 and the light guide 110 is reduced, thereby increasing the intensity of pressure of the holder 130 to the light guide 110, and enabling closer fit between the light guide 110 and the holder 130.

Preferably, the first rib extends from one end to the other end of the through hole, which facilitates processing.

Figure 6:
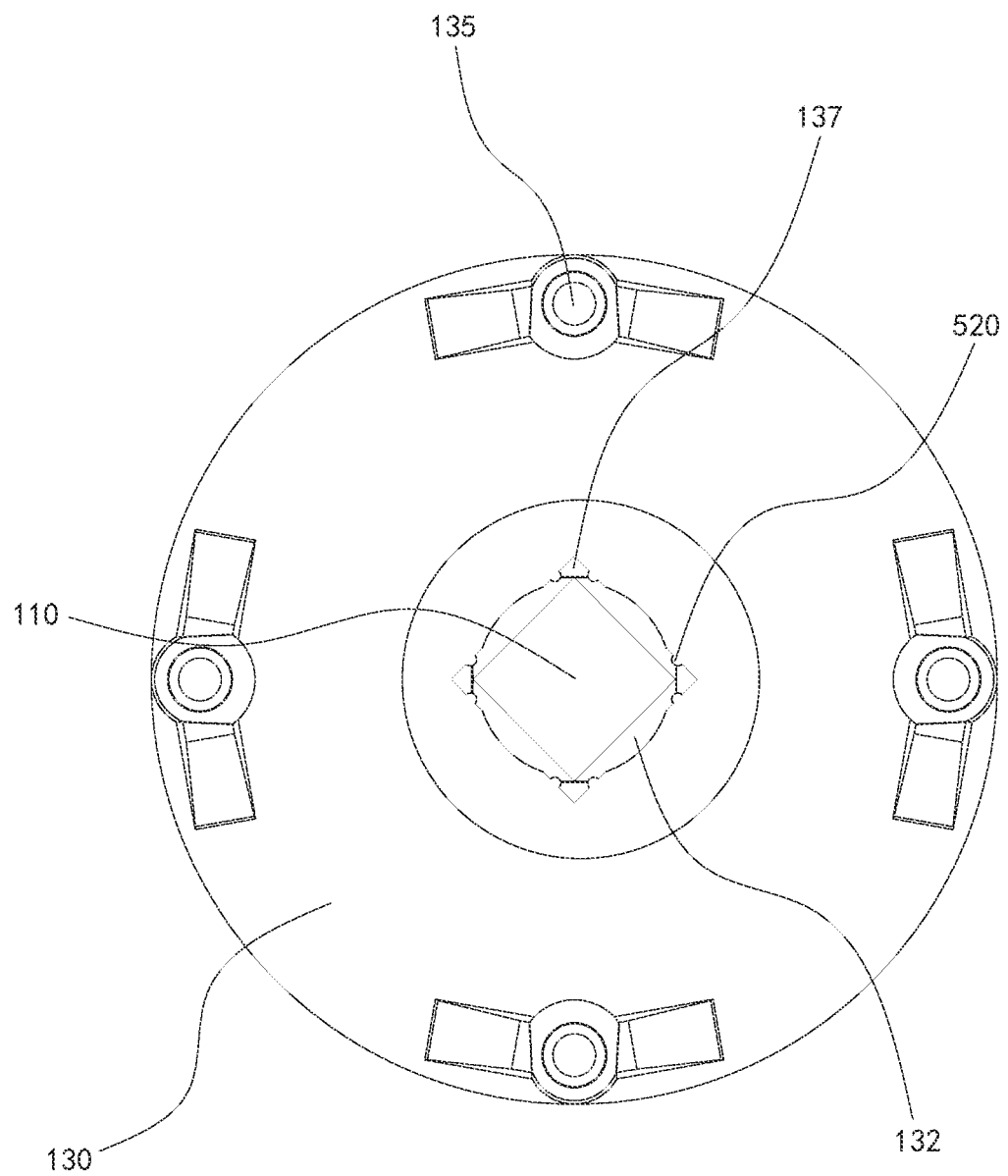
FIG. 6 is a bottom view of a light mixing device according to an embodiment of the present invention, viewed from a light incoming surface of the light guide.

Referring to FIG. 6, the end of the light guide close to the light source is a first light guide segment, the side wall of the first light guide segment has a plurality of edges 113, and in the length direction of the through hole 132, the inner side wall of the through hole 132 is provided with positioning grooves 137 corresponding to the edges of the first light guide segment. With such configuration, the edges 113 of the first light guide segment, when inserted, can be matched with the respect positioning groove 137, thereby enabling the light guide 130 to be quickly and accurately inserted and fixed in the through hole 132.

Preferable, the positioning grooves 137 runs through the both ends of the through hole 132, making processing easy and more facilitating positioning.

While the positioning grooves 137 may not run through the both ends of the through hole 132, namely the positioning grooves 137 may only be provided for one segment, according to some embodiments. The length of each positioning groove 137 is consistent with the length of the first light guiding segment, and the positioning groove 137 starts to extend from the end of the through hole 132 close to the light source 200.

A second light guide segment connected to the first light guide segment is further included, the end surface of the first light guide segment close to the light source is the light incoming surface, and the end surface of the second light guide segment away from the light source is the light output surface.

As shown in FIG. 6, second ribs 520 can be provided on both sides of the positioning groove 137 according to some embodiments, and each second rib 520 extends in the length direction of the through hole 132. In such embodiment, the positioning grooves 137 clamp the edges 113 of the light guide 110 cooperating with the second ribs 150, which can prevent the light guide from moving during operation.

The cover 140 can further include light shielding plates 142 for shielding the tensioning groove 137 when the cover 140 is fastened to the holder 130. The light shielding plate 142 can prevent light leakage as the light is emitted from the tensioning groove 133.

According to a preferable embodiment, in the direction away from the light source 200, the cross-sectional area of the light guide 110 is gradually increased, and the cross-sectional area of the through hole 132 is correspondingly gradually increased. In a direction close to the light source 200, the end of the light guide 110 close to the light incoming surface 112 is inserted into the through hole 132, then the light guide 110 is gradually pushed, and finally forming interference fit therebetween. In such way, the holder 130 thus can clamp and fix the light guide 110 more stably.

Obviously, the above-mentioned embodiments of the present invention are only examples for clearly illustrating the technical solutions of the present invention, rather than limiting the specific implementation modes of the present invention. Any modifications, equivalent replacements and improvements made within the spirit and principles of the claims of the present invention shall be included within the protection scope of the claims of the present invention.

The invention claimed is:

1. A stage light fixture with a split light mixing device, comprising
   a light source for generating a light beam; and
   a light mixing device for reflecting the light beam at least one time, which comprises a light guide with a gradually changing cross-sectional area and having a light output surface and a light incoming surface, the light beam transmitted from the light incoming surface to the light output, and a light beam homogenizer for receiving the light beam emitted from the light output surface of the light guide,
   wherein the light beam homogenizer and the light guide are independent of each other, and a cross-sectional area of the light beam homogenizer is at least 1.1 times of a cross-sectional area of the light output surface, and
   the stage light fixture further comprises a holder for clamping and fixing the light guide, and a cover fastened to an end of the holder away from the light source, which cover is configured to press the light beam homogenizer tightly to closely attach to the light output surface of the light guide.

2. The stage light fixture according to claim 1, wherein an end surface of the holder away from the light source is formed an accommodating cavity for accommodating the light beam homogenizer, the accommodating cavity being recessed in a direction close to the light source, and a thickness of the light beam homogenizer is greater than or equal to a depth of the accommodating cavity.

3. The stage light fixture according to claim 2, wherein a side wall of the accommodating cavity is provided with at least one positioning ribs for abutting against a periphery of the light beam homogenizer.

4. The stage light fixture according to claim 1, wherein a surface of the light beam homogenizer close to the light output surface of the light guide is in form of a smooth surface.

5. The stage light fixture according to claim 1, wherein a surface of the light beam homogenizer away from the light output surface of the light guide is in form of a frosting surface.

6. The stage light fixture according to claim 1, wherein the cover has a light passing hole for the light beam to pass through, and in a light emitting direction, a projection of the light output surface of the light guide is located in the light passing hole.

7. The stage light fixture according to claim 6, wherein a cross-sectional area of the light beam homogenizer is more than twice of a cross-sectional area of the light output surface.

8. The stage light fixture according to claim 6, wherein in a length direction of the holder, the cover is formed at least two connecting plates which extend to the holder, the holder is provided with fastening portions corresponding to the connecting plates, and the cover is fastened to the holder via the connecting plates.

9. The stage light fixture according to claim 6, wherein material of the cover is metal, and the cover is provided with an elastic member for abutting against the light guide.

10. The stage light fixture according to claim 9, wherein the elastic member is in form of a metal elastic piece connected to the cover.

11. The stage light fixture according to claim 10, wherein the metal elastic piece comprises a connecting segment and an abutting-pressing segment connected to each other, the connecting segment is connected to an inner side of the light passing hole, and the abutting-pressing segment is abutted against the light guide.

12. The stage light fixture according to claim 11, wherein the number of the metal elastic piece is multiple, the abutting-pressing segment of each metal elastic piece is in an arc shape, and the abutting-pressing segment of each metal elastic piece is successively end-to-end to from a ring shape.

13. The stage light fixture according to claim 9, wherein the elastic member is in form of an elastic spacer or a spring, which is arranged between the cover and the light guide.

14. The stage light fixture according to claim 1, wherein a thickness of the light beam homogenizer ranges from 1 mm to 3 mm.

15. The stage light fixture according to claim 1, wherein the holder further comprises a through hole for mounting the light guide, an end surface of the holder far away from the light source is, in a direction close to the light source, provided with tensioning grooves running through a side wall of the through hole, and an end surface of the light guide close to the light beam homogenizer is in an interference fit with the holder.

16. The stage light fixture according to claim 15, wherein several first ribs for fixing the light guide are provided in the through hole, which extend in a length direction of the holder, and the through hole is in an interference fit with the light guide via the first ribs.

17. The stage light fixture according to claim 15, wherein a side wall of an end of the light guide close to the light source has a plurality of edges, and in a length direction of the through hole, an inner side wall of the through hole is provided with positioning grooves corresponding to the edges.

18. The stage light fixture according to claim 17, wherein second ribs are provided on both sides of each positioning groove, and the second rib is extended in the length direction of the through hole.

19. The stage light fixture according to claim 15, wherein the cover further comprises light shielding plates for correspondingly shielding the tensioning grooves when the cover is fastened to the holder.

20. The stage light fixture according to claim 15, wherein in a direction away from the light source, a cross-sectional area of the light guide is gradually increased, and a cross-sectional area of the through hole is correspondingly gradually increased.

* * * * *